United States Patent
Kim et al.

(10) Patent No.: US 9,953,437 B1
(45) Date of Patent: Apr. 24, 2018

(54) METHOD AND DEVICE FOR CONSTRUCTING A TABLE INCLUDING INFORMATION ON A POOLING TYPE AND TESTING METHOD AND TESTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/786,680

(22) Filed: Oct. 18, 2017

(51) Int. Cl.
  *G06T 9/00* (2006.01)
  *G06T 11/20* (2006.01)
  *G06T 1/00* (2006.01)
  *G06T 7/11* (2017.01)

(52) U.S. Cl.
  CPC ............ *G06T 9/002* (2013.01); *G06T 1/0007* (2013.01); *G06T 7/11* (2017.01); *G06T 11/203* (2013.01); *G06T 2207/20021* (2013.01); *G06T 2207/20081* (2013.01); *G06T 2207/20084* (2013.01)

(58) Field of Classification Search
  CPC ...... G06T 3/4046; G06K 9/66; G06K 9/6256; G06K 9/4604; G06K 9/00288; G06K 9/00744; G06K 9/46; G06K 9/6267; G06N 3/08; G06N 3/02
  See application file for complete search history.

(56) References Cited

PUBLICATIONS

Scherer, Dominik, Andreas Müller, and Sven Behnke. "Evaluation of pooling operations in convolutional architectures for object recognition." Artificial Neural Networks—ICANN 2010 (2010): 92-101.*

(Continued)

*Primary Examiner* — Stephen R Koziol
*Assistant Examiner* — Rapheal Schwartz
(74) *Attorney, Agent, or Firm* — Husch Blackwell LLP (57) ABSTRACT

A method for constructing a table including information on a pooling type based on ranges of scale of at least one object in at least one image for constructing table is provided. The method includes steps of: generating a first pooled feature map by applying max pooling and a second pooled feature map by applying avg pooling; and acquiring a first candidate bounding box by using the first pooled feature map and acquiring a second candidate bounding box by using the second pooled feature map; and comparing a first degree of similarity between the first candidate bounding box and a GT bounding box with a second degree of similarity between the second candidate bounding box and the GT bounding box to thereby construct the table so as to include information on respective optimal pooling types by respective ranges of the scale of the object.

26 Claims, 6 Drawing Sheets

(56) References Cited

PUBLICATIONS

Girshick, Ross. "Fast r-cnn." Proceedings of the IEEE international conference on computer vision. 2015.*
Ren, Shaoqing, et al. "Faster R-CNN: Towards real-time object detection with region proposal networks." Advances in neural information processing systems. 2015.*

\* cited by examiner

|  | SCALE 1 (0~15 PIXELS) | SCALE 2 (16~31 PIXELS) | ... | SCALE N (K~J PIXELS) |
|---|---|---|---|---|
| PEDESTRIAN | $a_{max}/a_{avg}$ | $b_{max}/b_{avg}$ | ... | $c_{max}/c_{avg}$ |
| CAR | $e_{max}/e_{avg}$ | $f_{max}/f_{avg}$ | ... | $g_{max}/g_{avg}$ |
| ... | ... | ... | ... | ... |

METHOD AND DEVICE FOR CONSTRUCTING A TABLE INCLUDING INFORMATION ON A POOLING TYPE AND TESTING METHOD AND TESTING DEVICE USING THE SAME

FIELD OF THE INVENTION

The present invention relates to a method and a device for constructing a table including information on a pooling type and a testing method and a testing device using the same, more particularly, to the method including steps of: (a) a table-constructing device acquiring the image for constructing table including the object as an input for a CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more average pooling operations to one or more areas, corresponding to the ROI for training, in the one or more feature maps, wherein each of the average pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process; (b) the table-constructing device allowing the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (c) the table-constructing device (ii-1) generating a first pooled feature map for constructing table by applying one or more max pooling operations to one or more areas, corresponding to the ROI for constructing table, in the one or more feature maps and (ii-2) generating a second pooled feature map for constructing table by applying one or more average pooling operations to one or more areas, corresponding to the ROI for constructing table, in the one or more feature maps; and (iii-1) allowing the first FC layer to acquire information on pixel data of a first candidate bounding box for constructing table by applying regression operations to the first pooled feature map for constructing table, and (iii-2) allowing the second FC layer to acquire information on pixel data of a second candidate bounding box for constructing table by applying regression operations to the second pooled feature map for constructing table; and (d) the table-constructing device comparing (i) a first degree of similarity between the first candidate bounding box for constructing table and a bounding box in a second GT image with (ii) a second degree of similarity between the second candidate bounding box for constructing table and the bounding box in the second GT image to thereby construct the table so as to include information on respective optimal pooling types by respective ranges of the scale of the object in the second GT image or the object in the image for constructing table; and the testing method and the testing device using the same.

BACKGROUND OF THE INVENTION

In Machine Learning, a convolutional neural network (CNN or ConvNet) is a class of deep, feed-forward artificial neural network that has successfully been applied to analyzing visual imagery.

Figure 1:
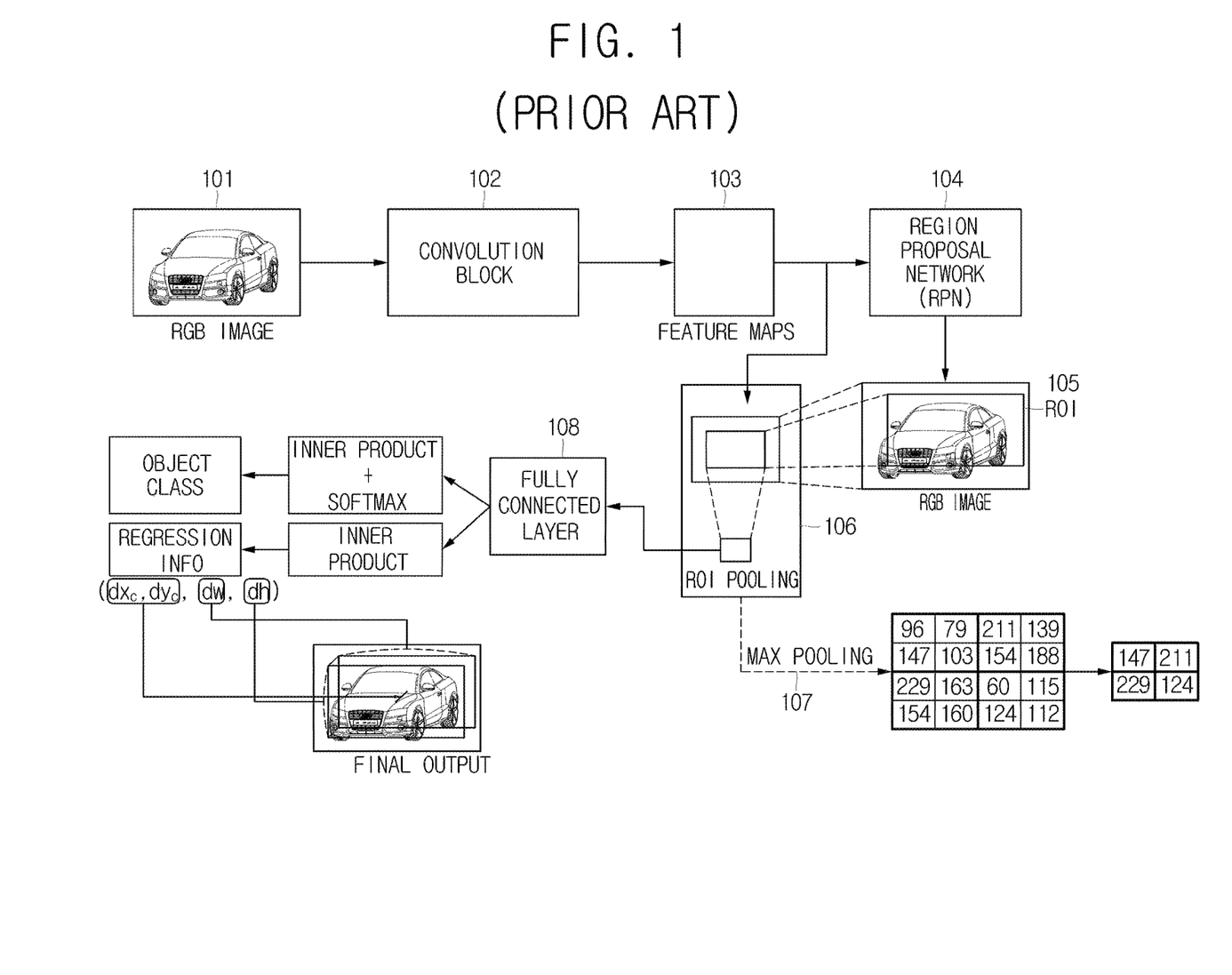
FIG. 1 is a drawing schematically illustrating a learning process of a conventional CNN according to prior art.

FIG. 1 is a drawing schematically illustrating a learning process of a conventional CNN according to prior art. Specifically, FIG. 1 shows the process of comparing a predicted bounding box by a learning device with a Ground Truth (GT) bounding box. Herein, the losses stand for differences between the predicted bounding box and the GT bounding box, and are denoted as $dx_c$, $dy_c$, dw, dh as shown in FIG. 1.

First, as illustrated in FIG. 1, the learning device may acquire an RGB image as an input to be fed into a plurality of convolutional layers, i.e., convolutional filters, included in a convolution block. A size, e.g., a width and a height, of the RGB image becomes smaller while the number of channels is incremented as the RGB image passes through the plurality of convolutional layers.

As illustrated in FIG. 1, the learning device allows a Region Proposal Network (RPN) to generate proposal boxes from an ultimate feature map outputted by the convolution block and allows a pooling layer, e.g., ROI pooling layer, to resize areas on the feature map corresponding to the proposal boxes to a predetermined size, e.g., a size of 2×2, by applying a max pooling operation (or an average pooling operation) to pixel data of the areas on the feature map corresponding to the proposal boxes. As a result, a pooled feature map is acquired. For a reference, the pooled feature map may also be referred to as a feature vector. Herein, the max pooling operation is an operation by which each maximum value in each of sub-regions divided from a subject area on a feature map is selected as each of representative values for the subject area, as shown in the bottom right of FIG. 1.

Next, the pooled feature map may be allowed to be fed into a fully connected (FC) layer.

Then, the learning device may allow the FC layer to recognize a category of an object in the RGB image. In addition, the predicted bounding box in the RGB image may be acquired through the FC layer, and the losses may also be acquired by comparing between the predicted bounding box and the ground truth (GT) bounding box. Herein, the GT bounding box represents a bounding box precisely surrounding the object in the RGB image, which may usually be prepared by a human being.

Lastly, the learning device in FIG. 1 may adjust at least one of parameters included in the FC layer, the RPN, or the plurality of convolutional layers by using the losses during a backpropagation process.

Thereafter, a testing device (not illustrated) having the CNN with the adjusted parameters may acquire a bounding box surrounding an object in a test image, later. However, even if the testing device has the CNN with the adjusted parameters, it is very difficult to obtain the bounding box precisely surrounding the object in the test image because a predetermined pooling operation, e.g., either the max pooling operation or the average pooling operation, is provided regardless of a class or a scale of the object in the input image.

Accordingly, the applicant of the present invention proposes a method and a device for constructing a table including information on an optimal pooling type and a testing method and a testing device using the same to overcome the drawback set forth above.

SUMMARY OF THE INVENTION

It is an object of the present invention to solve the problems described above.

It is another object of the present invention to determine optimal pooling types by respective categories and/or scales of objects, and to construct a table including information on the optimal pooling types by the respective categories and/or by the respective scales of the objects.

It is still another object of the present invention to apply pooling operations to test images by referring to the table including the information on the optimal pooling types.

In accordance with one aspect of the present invention, there is provided a method for constructing a table including information on a pooling type based on ranges of scale of at least one object in at least one image for constructing table, including steps of: (a) a table-constructing device acquiring or supporting another device to acquire the image for constructing table including the object as an input for a CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process; (b) the table-constructing device allowing the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (c) the table-constructing device (c-1) generating a first pooled feature map for constructing table by applying one or more max pooling operations to one or more areas, corresponding to the ROI for constructing table, in the one or more feature maps and (c-2) generating a second pooled feature map for constructing table by applying one or more avg pooling operations to one or more areas, corresponding to the ROI for constructing table, in the one or more feature maps; and (c-3) allowing the first FC layer to acquire information on pixel data of a first candidate bounding box for constructing table by applying regression operations to the first pooled feature map for constructing table, and (c-4) allowing the second FC layer to acquire information on pixel data of a second candidate bounding box for constructing table by applying regression operations to the second pooled feature map for constructing table; and (d) the table-constructing device comparing a first degree of similarity between the first candidate bounding box for constructing table and a bounding box in a second GT image with a second degree of similarity between the second candidate bounding box for constructing table and the bounding box in the second GT image to thereby construct the table so as to include information on respective optimal pooling types by respective ranges of the scale of the object in the second GT image or the object in the image for constructing table.

In accordance with another aspect of the present invention, there is provided a method for using a table including information on a pooling type for at least one object for testing in at least one test image by using a testing device including a CNN, including steps of: (a) the testing device acquiring or supporting another device to acquire the test image, on the condition that (I) a table-constructing device has acquired at least one image for constructing table including at least one object for constructing table as an input for the CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process; (II) the table-constructing device has allowed the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (III) the table-constructing device (ii-1) has generated a first pooled feature map for constructing table by applying one or more max pooling operations to one or more areas, corresponding to the ROI for constructing table, in the one or more feature maps and (ii-2) has generated a second pooled feature map for constructing table by applying one or more avg pooling operations to one or more areas, corresponding to the ROI for constructing table, in the one or more feature maps; and (iii-1) has allowed the first FC layer to acquire information on pixel data of a first candidate bounding box for constructing table by applying regression operations to the first pooled feature map for constructing table, and (iii-2) has allowed the second FC layer to acquire information on pixel data of a second candidate bounding box for constructing table by applying regression operations to the second pooled feature map for constructing table; and (IV) the table-constructing device has compared (i) a first degree of similarity between the first candidate bounding box for constructing table and a bounding box in a second GT image with (ii) a second degree of similarity between the second candidate bounding box for constructing table and the bounding box in the second GT image to thereby construct the table so as to include information on respective optimal pooling types by respective ranges of the scale of the object in the second GT image or the object in the image for constructing table; (b) the testing device allowing the plurality of convolutional layers to apply the convolution operations to the test image to thereby acquire one or more feature maps for testing, and allowing the RPN to perform certain operations on the at least one of feature maps for testing to thereby acquire an ROI for testing; (c) the testing device generating a pooled feature map for testing by using a specific optimal pooling type selected among the max pooling type and the avg pooling type, wherein the specific optimal pooling type is determined by referring to the table which includes information corresponding to the scale of the ROI for testing; (d) the testing device acquiring a bounding box for testing by applying regression operations to the pooled feature map for testing via the FC layer.

In accordance with still another aspect of the present invention, there is provided a table-constructing device for constructing a table including information on a pooling type based on ranges of scale of at least one object in at least one image for constructing table, including: a communication part for acquiring or supporting another device to acquire the image for constructing table including the object as an input for a CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process; a processor for (I) allowing the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (II) (II-1) generating a first pooled feature map for constructing table by applying one or more max pooling operations to one or more areas, corresponding to the ROI for constructing table, in the one or more feature maps and (II-2) generating a second pooled feature map for constructing table by applying one or more avg pooling operations to one or more areas, corresponding to the ROI for constructing table, in the one or more feature maps; and (II-3) allowing the first FC layer to acquire information on pixel data of a first candidate bounding box for constructing table by applying regression operations to the first pooled feature map for constructing table, and (II-4) allowing the second FC layer to acquire information on pixel data of a second candidate bounding box for constructing table by applying regression operations to the second pooled feature map for constructing table; and (III) comparing a first degree of similarity between the first candidate bounding box for constructing table and a bounding box in a second GT image with a second degree of similarity between the second candidate bounding box for constructing table and the bounding box in the second GT image to thereby construct the table so as to include information on respective optimal pooling types by respective ranges of the scale of the object in the second GT image or the object in the image for constructing table.

In accordance with still yet another aspect of the present invention, there is provided a testing device for using a table including information on a pooling type for at least one object for testing in at least one test image, including: a communication part for acquiring or supporting another device to acquire the test image, on the condition that (I) a table-constructing device has acquired at least one image for constructing table including at least one object for constructing table as an input for a CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process; (II) the table-constructing device has allowed the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (III) the table-constructing device (ii-1) has generated a first pooled feature map for constructing table by applying one or more max pooling operations to one or more areas, corresponding to the ROI for constructing table, in the one or more feature maps and (ii-2) has generated a second pooled feature map for constructing table by applying one or more avg pooling operations to one or more areas, corresponding to the ROI for constructing table, in the one or more feature maps; and (iii-1) has allowed the first FC layer to acquire information on pixel data of a first candidate bounding box for constructing table by applying regression operations to the first pooled feature map for constructing table, and (iii-2) has allowed the second FC layer to acquire information on pixel data of a second candidate bounding box for constructing table by applying regression operations to the second pooled feature map for constructing table; and (IV) the table-constructing device has compared (i) a first degree of similarity between the first candidate bounding box for constructing table and a bounding box in a second GT image with (ii) a second degree of similarity between the second candidate bounding box for constructing table and the bounding box in the second GT image to thereby construct the table so as to include information on respective optimal pooling types by respective ranges of the scale of the object in the second GT image or the object in the image for constructing table; a processor for (AA) allowing the plurality of convolutional layers to apply the convolution operations to the test image to thereby acquire one or more feature maps for testing, and allowing the RPN to perform certain operations on the at least one of feature maps for testing to thereby acquire an ROI for testing; (BB) generating a pooled feature map for testing by using a specific optimal pooling type selected among the max pooling type and the avg pooling type, wherein the specific optimal pooling type is determined by referring to the table which includes information corresponding to the scale of the ROI for testing; (CC) acquiring a bounding box for testing by applying regression operations to the pooled feature map for testing via the FC layer.

BRIEF DESCRIPTION OF THE DRAWINGS

The drawings attached below are to explain example embodiments of the present invention and are only part of preferred embodiments of the present invention. Other drawings may be obtained based on the drawings herein without inventive work for those skilled in the art. The above and other objects and features of the present invention will become conspicuous from the following description of preferred embodiments given in conjunction with the accompanying drawings, in which.

DETAILED DESCRIPTION OF THE PREFERRED EMBODIMENTS

To make purposes, technical solutions, and advantages of the present invention clear, reference is made to the accompanying drawings that show, by way of illustration, more detailed example embodiments in which the invention may be practiced. These preferred embodiments are described in sufficient detail to enable those skilled in the art to practice the invention.

It is to be appreciated that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be appreciated that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, preferred embodiments of the present invention will be described in detail with reference to the accompanying drawings so that those skilled in the art may easily implement the present invention.

Figure 2:
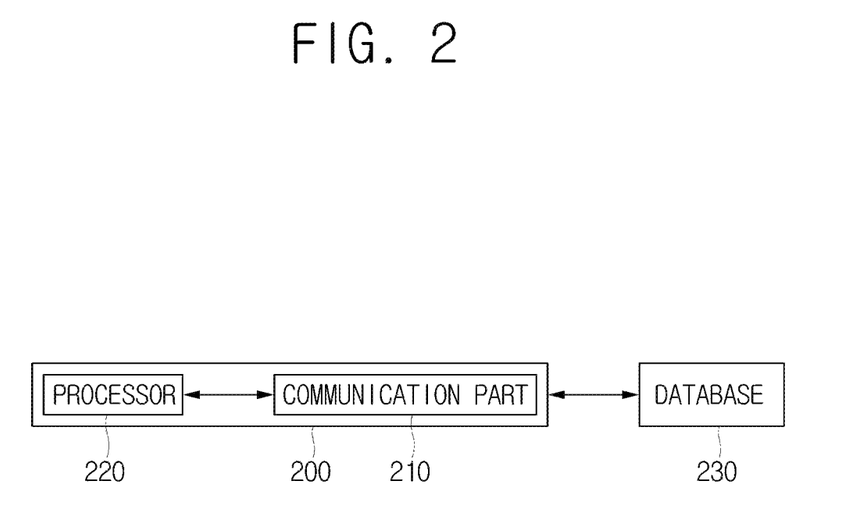
FIG. 2 is a block diagram schematically illustrating a table-constructing device 200 in accordance with one example embodiment of the present invention.

FIG. 2 is a block diagram schematically illustrating a table-constructing device 200 in accordance with one example embodiment of the present invention.

As illustrated in FIG. 2, the table-constructing device 200 with a CNN may include a communication part 210 and a processor 220. And, the table-constructing device 200 may further include a database 230 unlike FIG. 2. As the case may be, the table-constructing device 200 may not include the database 230 like FIG. 2.

After a learning device (not shown) has acquired adjusted parameters of the CNN by performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps and (ii-2) generating a second pooled feature map for training by applying one or more average pooling operations to one or more areas, corresponding to the ROI for training, in the one or more feature maps; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a GT bounding box for training, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the GT bounding box for training, thereby using the second comparative data to adjust at least one of parameters of the CNN during the backpropagation process, the communication part 210 of the table-constructing device 200 may acquire at least one input image for constructing table or information on at least one region of interest (ROI) for constructing table in the input image for constructing table. That is, the communication part 210 of the table-constructing device 200 may acquire the input image for constructing table in an RGB format or information on the ROI for constructing table from a Region Proposal Network (RPN) in another device.

Hereinafter, for a convenience of explanation on FIGS. 2 to 5, the expression "for constructing table" will be omitted.

Meanwhile, the processor 220 of the table-constructing device 200 may be configured to construct a table by using information on an optimal pooling type which is determined to be either a max pooling or an average pooling for each of ranges of scale of objects in the input images and/or for each of categories thereof. More details with respect to determining the optimal pooling type will be disclosed and delineated later in the present disclosure.

Further, the database 230 may be configured to store information used to construct the table and information recorded in the table, e.g., the optimal pooling types for the respective scales and/or respective categories of the objects, and the database 230 may be accessed by the communication part 210 of the table-constructing device 200.

For a reference, any digital computing device with at least one processor to perform operations or computations disclosed within the present disclosure may be adopted as the table-constructing device 200.

Figure 3:
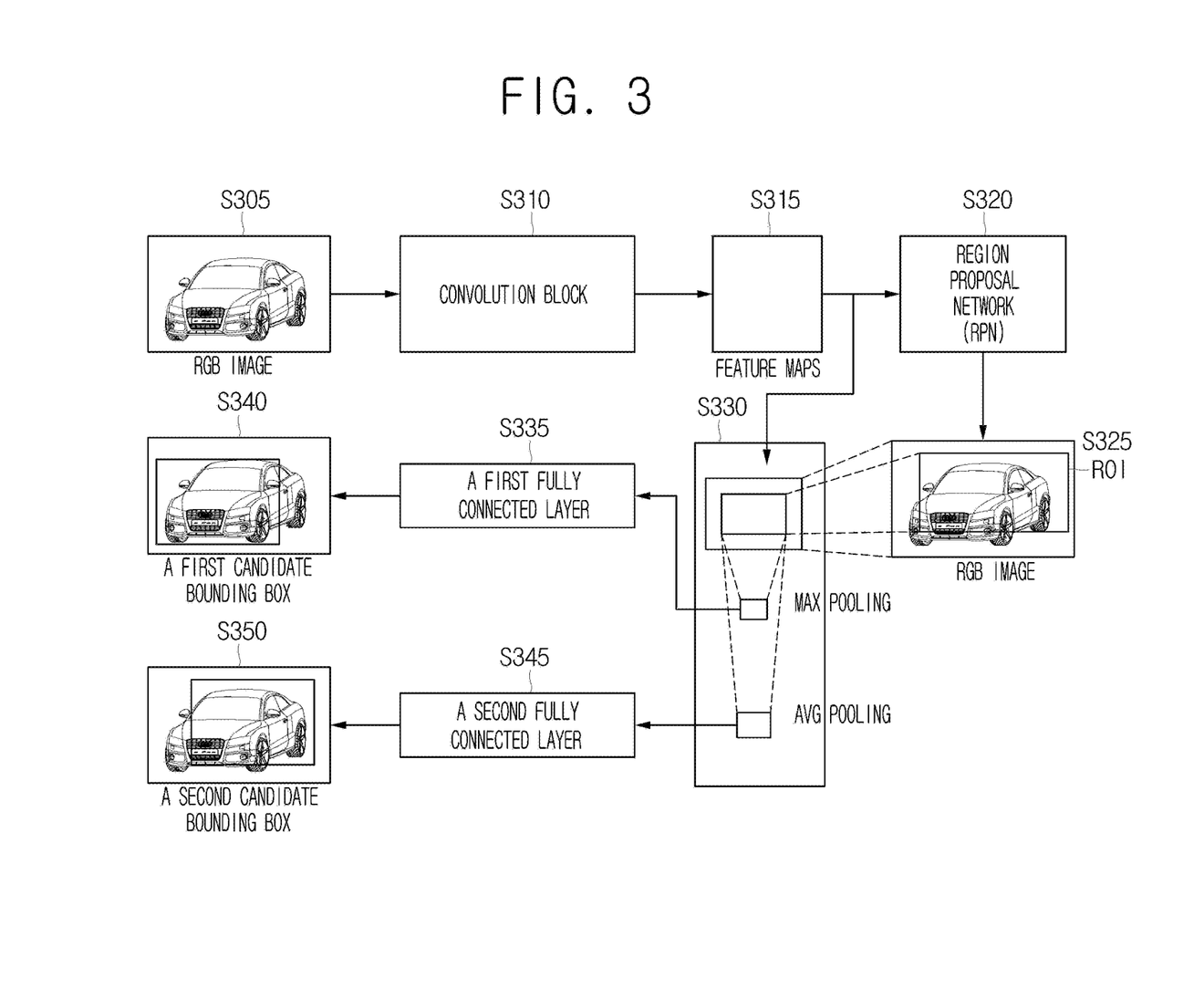
FIG. 3 is a drawing schematically illustrating a process of acquiring respective bounding boxes by respectively applying a max pooling operation or an average pooling operation to an area on a feature map corresponding to a region of interest (ROI) in an input image.

FIG. 3 is a drawing schematically illustrating a process of the table-constructing device 200 acquiring respective bounding boxes by respectively applying a max pooling operation or an average pooling operation to an area on a feature map corresponding to a region of interest (ROI) in an input image. For reference, a configuration of CNN as shown in FIG. 3 may be included in not only the table-constructing device 200 but also the learning device. A difference of the configuration of CNN between the table-constructing device 200 and the learning device is that the learning device further includes at least one loss layer to be used for a backpropagation process.

Figure 4:
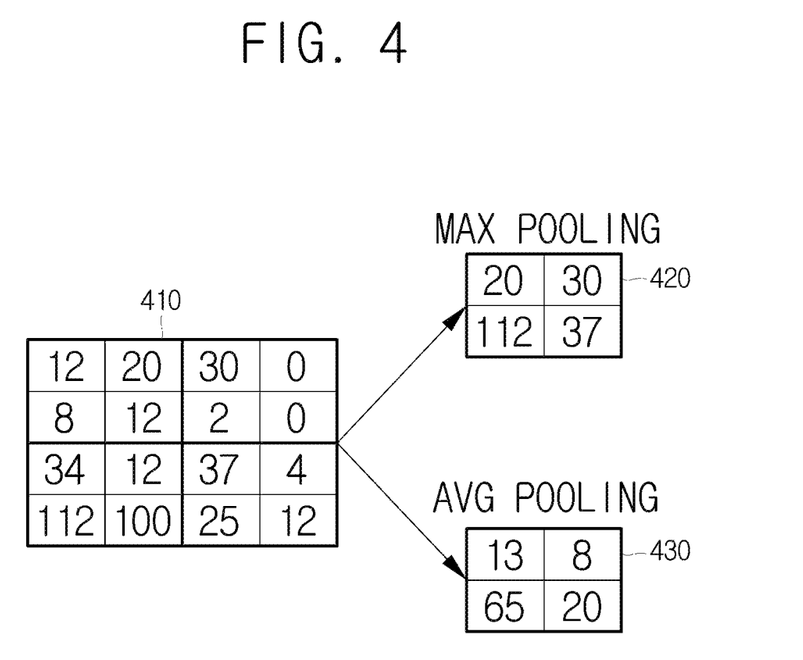
FIG. 4 is a drawing exemplarily demonstrating the max pooling operation and the average pooling operation performed on the area.

Meanwhile, FIG. 4 is a drawing exemplarily demonstrating the max pooling operation and the average pooling operation performed on the area.

The learning device (not shown) and the table-constructing device 200 including the CNN with a configuration illustrated in FIG. 3 may contain the convolution block, the Region Proposal Network (RPN), the ROI pooling layer, and at least one fully-connected (FC) layer and so forth.

Specifically, the communication part 210 of the table-constructing device 200 may receive or support another device to receive an input image, e.g., an RGB image, at a step of S305, and then the processor 220 thereof may allow the plurality of convolutional layers to apply the convolution operations to the image at a step of S310 to thereby acquire one or more feature maps at a step of S315, and allow the RPN to perform certain operations on the at least one of feature maps at a step of S320 to thereby acquire an ROI at a step of S325.

Thereafter, the processor 220 of the table-constructing device 200 may be configured to generate (i) a first pooled feature map by applying one or more max pooling operations to one or more areas, corresponding to the ROI, in the at least one of the feature maps, and (ii) a second pooled feature map by applying one or more average pooling operations to one or more areas, also corresponding to the ROI, in the at least one of the feature maps at a step of S330.

As an example illustrated in FIG. 4, the ROI may be represented as an area 410 of 4×4 pixels, i.e., 16 pixels.

In FIG. 4, the area 410 corresponding to the ROI for constructing table acquired from the RPN is shown. For example, the pixel data in the area 410 are represented as numerical values, but it is not limited thereto. The area 410 may be divided into four sub-regions, each of which has a size of 2×2 pixels. It is conspicuous for those skilled in the art that number of pixels included in each of the multiple sub-regions along with number of the multiple divided sub-regions is not necessarily limited thereto.

Referring to FIG. 4, the first pooled feature map 420 is acquired by applying the max pooling operation to the area 410 whereas the second pooled feature map 430 is obtained by applying the average pooling operation to the same area 410. According to the max pooling operation, each pixel with each maximum pixel value among pixels within each of the multiple sub-regions is selected as the first pooled feature map, and according to the average pooling operation, the pixel values included in each of the multiple sub-regions are averaged and then each of the averaged values is determined as the second pooled feature map.

Referring to FIG. 3 again, the processor of the table-constructing device may be configured to allow a first FC layer to acquire information on pixels of a first candidate bounding box at a step of S340 by applying regression operations to the first pooled feature map at a step of S335, and configured to allow a second FC layer to acquire information on pixels of a second candidate bounding box at a step of S350 by applying regression operations to the second pooled feature map at a step of S345. For a reference, the information on the pixels may be pixel coordinates, but it is not necessarily limited thereto. Herein, the first FC layer and the second FC layer may not be separate layers, as the case may be. However, in case the learning device or the table-constructing device is comprised of multiple computing devices, the first FC layer and the second FC layer may be separately included in the different computing devices.

Thereafter, the processor 220 of the table-constructing device 200 may be configured to compare (i) a first degree of similarity between the first candidate bounding box and a GT bounding box with (ii) a second degree of similarity between the second candidate bounding box and the GT bounding box, to thereby construct the table so as to include information on respective optimal pooling types by respective ranges of the scale of the object in the GT image or those of the object in the input image. For another example, the table may be constructed so as to include information on respective optimal pooling types by not only respective ranges of the scale of the object but also respective categories of the object in the GT image or those of the object in the input image.

Figure 5:
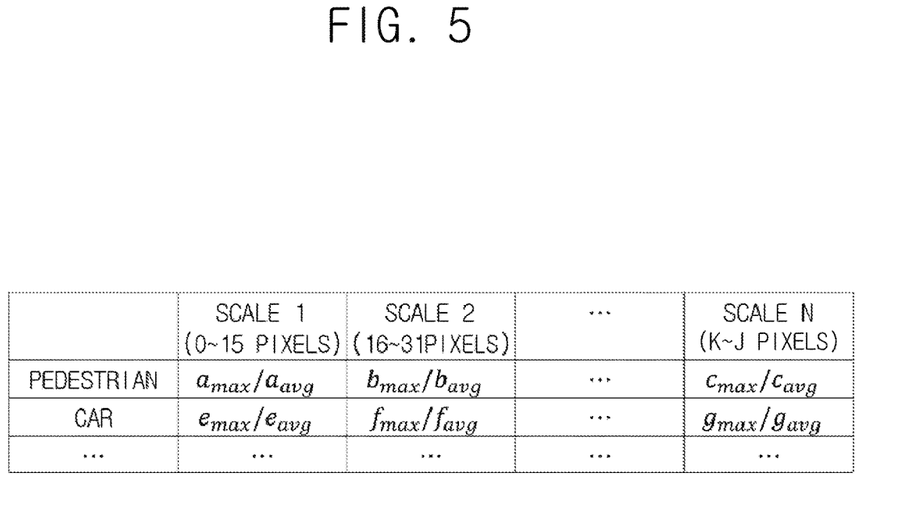
FIG. 5 is a drawing illustrating a table constructed by respective ranges of scale of objects in input images in accordance with one example embodiment of the present invention.

FIG. 5 is a drawing illustrating the table constructed by respective ranges of scale of objects in input images in accordance with one example embodiment of the present invention.

Referring to FIG. 5, the table is constructed to store information on respective optimal pooling types by the respective ranges of the scale of the objects in the GT image and/or the categories thereof, but it is not limited thereto.

Specifically, the processor 220 of the table-constructing device 200 may be configured to compare the first candidate bounding box with the GT bounding box to acquire the first degree of similarity therebetween. Likewise, the processor 220 of the table-constructing device 200 may be configured to compare the second candidate bounding box with the GT bounding box to acquire the second degree of similarity therebetween.

Herein, the first degree of similarity (or the second degree of similarity) is calculated as a ratio of (i) an area corresponding to an intersection of a region within the first candidate bounding box (or a region within the second candidate bounding box) and a region within the GT bounding box to (ii) an area corresponding to a union of the region within the first candidate bounding box (or the region within the second candidate bounding box) and the region of the GT bounding box.

For example, if the first degree of similarity is 3/4 and the second degree of similarity is 1/3, a result of applying the max pooling operations is determined as being closer to the GT bounding box than that of applying the average pooling operations.

For a reference, any information that may distinguish a difference between the first candidate bounding box and the GT bounding box or between the second candidate bounding box and the GT bounding box may be used to compute the respective degrees of similarity. Such information may be at least one of the following: centric coordinates (or other predetermined coordinates) of the candidate bounding boxes and the GT bounding box, widths thereof or heights thereof.

Furthermore, the processor 220 of the table-constructing device 200 may be configured to further store information on the respective optimal pooling types, in the table shown in FIG. 5, by the respective ranges of the scale and/or the respective categories.

Herein, the scales of the respective objects may be determined as applying a square root operation to the number of pixels of the region within the GT bounding boxes (or a region within the first candidate bounding box or that within the second candidate bounding box), but it is not limited thereto. For example, other operations may be applied to the region in order to obtain the scale. A result of the square root operation may be a real number. In case the result is 14, it falls in the range of "scale 1", which is included in a range of zero to fifteen, in the table shown in FIG. 5.

In detail, performing the square root operation on the region within the GT bounding box may obtain a value which may fall under one of the ranges of the scale. It is conspicuous for those skilled in the art that the ranges of the scale is determined based on certain criteria and thus it is may not be limited thereto.

As another example, the processor 220 of the table-constructing device 200 may be configured to construct the table by comparing the first degree of similarity with the second degree of similarity multiple times to determine the optimal pooling types for the respective objects.

In detail, whenever each result of the comparison is acquired, an accuracy count for the max pooling operations or that for the average pooling operations is increased by one. And by comparing the accuracy count of the max pooling operations with that of the averaging pooling operations for the respective ranges of the scale of the objects and/or the respective categories thereof, the processor 220 of the table-constructing device 200 may be able to determine the optimal pooling types for the respective ranges of the scale of the objects and/or the respective categories thereof.

For example, in case 1000 input images contain objects with a specific range of scale, e.g., scale 2, and if the accuracy count for the max pooling operations is 500 and that for the average pooling operations is 800, then the processor 220 of the table-constructing device 200 may determine the optimal pooling type for the scale 2 to be the average pooling.

As still another example, the optimal pooling type may be determined for the specific range of the scale of all kinds of the objects to the same one, e.g., the average pooling, regardless of the categories of the respective objects within the specific range of the scale, but it is not limited thereto.

For instance, if there are 10 classes, e.g., pedestrian, vehicle, road, and building etc., and if most of the classes, i.e., categories, indicate that their corresponding optimal pooling types are the max pooling except for the pedestrian, then the optimal pooling types for all the kinds of the objects including the pedestrian may be set to the max pooling even if the optimal pooling type for the pedestrian is the average pooling.

As still yet another example, the processor 220 of the table-constructing device 200 may also store and manage a critical range of the scale for the respective categories of the objects.

Herein, the critical range of the scale for the respective categories of the objects is a range of the scale from which one degree of similarity becomes greater than or equal to the other degree of similarity.

Generally, the average pooling operations are performed on the objects with smaller scales while the max pooling operations are applied to the objects with larger scales.

Accordingly, as the scale is increased, for each category of the object, there is its corresponding specific critical range where the degree of similarity according to the max pooling operation becomes greater than or equal to that according to the average pooling operation.

Thus, the table-constructing device 200 may store and manage the critical range of the scale for each kind of object.

Besides, in accordance with another example embodiment of the present invention, if plural number of feature maps are generated from each of the input images by the convolutional layers, the table-constructing device 200 generates the first pooled feature map by applying the max pooling operations to a certain plural number of areas, corresponding to the ROI, in the certain plural number of feature maps, and the second pooled feature map by applying the average pooling operations to the certain plural number of areas, corresponding to the ROI, in the certain plural number of feature maps.

Herein, each of the optimal pooling types includes either of (i) the certain plural number of sub-pooling types corresponding to the certain plural number of the feature maps or (ii) an integrated pooling type determined by referring to the certain plural number of the sub-pooling types.

For example, if each of the optimal pooling types includes (i) the certain plural number(=3) of sub-pooling types corresponding to the certain plural number(=3) of the feature maps, on condition that three feature maps with different sizes are generated from each of the input images, each of the optimal sub-pooling types for each of the three feature maps to be recorded in a cell of the table may be represented as a1, a2, a3. Herein, the optimal sub-pooling types may be determined by comparing different combinations of the max pooling operations and the average pooling operations with regard to the three feature maps to figure out which one of the combinations may generate a candidate bounding box that is overlapped with the GT bounding box with a highest precision. As the case may be, either a series of the max pooling operations or a series of the average pooling operations may be applied to the three feature maps.

On the other hand, if each of the optimal pooling types includes (ii) an integrated pooling type determined by referring to the certain plural number of the sub-pooling types, the processor 220 of the table-constructing device 200 may refer to the optimal sub-pooling types for the corresponding feature maps in order to acquire the single optimal pooling type for the multiple feature maps. For example, if the optimal sub-pooling types of the three feature maps are $a1_{max}, a2_{avg}, a3_{max}$ or $a1_{max}, a2_{max}, a3_{avg}$, then $a_{max}$ may be determined as the single optimal pooling type for the CNN.

For reference, the input images for the table-constructing device 200 may be different from the input images for training, but the input images for the table-constructing device 200 may be identical to the input images for training, as the case may be. Therefore, the GT image for constructing table may be different from or identical to the GT image for training.

Figure 6:
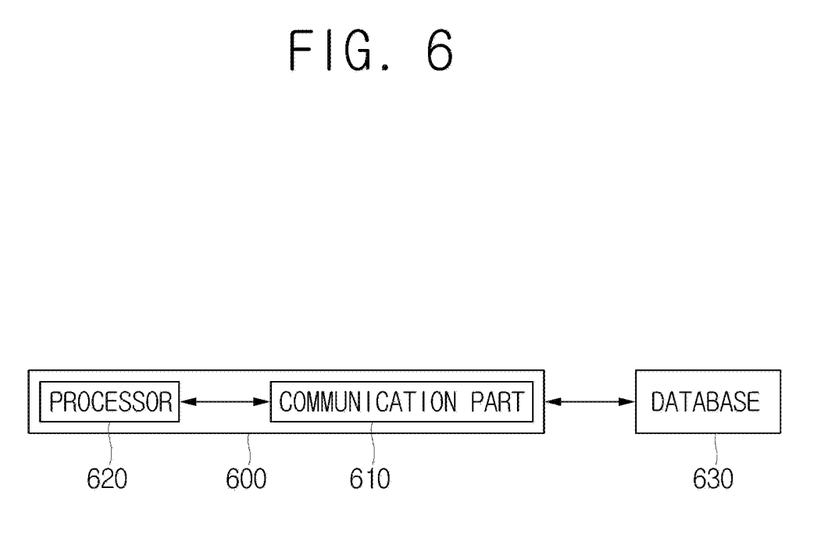
FIG. 6 is a block diagram schematically illustrating a testing device in accordance with one example embodiment of the present invention.

FIG. 6 is a block diagram schematically illustrating a testing device 600 in accordance with one example embodiment of the present invention.

As illustrated in FIG. 6, the testing device 600 may include a communication part 610 and a processor 620. And, the testing device 600 may further include a database 630 unlike FIG. 6. As the case may be, the testing device 600 may not include the database 630 as well.

For a reference, the testing device 600, the table-constructing device 200 and the learning device (not shown) may be the same computing device, but it is conspicuous for those skilled in the art that the aforementioned devices may also be separate computing devices.

The testing device 600 may use the table including the information on the optimal pooling types for at least one object for testing in at least one test image.

After (I) the table-constructing device 200 has acquired at least one image for constructing table including at least one object for constructing table as an input for the CNN with adjusted parameters, wherein the adjusted parameters have been acquired by the learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from the Region Proposal Network (RPN); (ii)(ii-1) generating a first pooled feature map for training by applying one or more max pooling operations to one or more areas, corresponding to the ROI for training, in the one or more feature maps and (ii-2) generating a second pooled feature map for training by applying one or more average pooling operations to one or more areas, corresponding to the ROI for training, in the one or more feature maps; and (iii)(iii-1) allowing the first FC layer to acquire information on pixel data of a first candidate bounding box for training by applying regression operations to the first pooled feature map for training, and allowing the first loss layer to acquire the first comparative data by comparing between information on the pixel data of the first candidate bounding box for training and that of a GT bounding box for training, thereby using the first comparative data to adjust at least one of parameters of the CNN during the backpropagation process, and (iii-2) allowing the second FC layer to acquire information on pixel data of a second candidate bounding box for training by applying regression operations to the second pooled feature map for training, and allowing the second loss layer to acquire the second comparative data by comparing between information on the pixel data of the second candidate bounding box for training and that of the GT bounding box for training, thereby using the second comparative data to adjust at least one of parameters of the CNN during the backpropagation process; (II) the table-constructing device has allowed the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (III) the table-constructing device 200 (ii-1) has generated the first pooled feature map for constructing table by applying one or more max pooling operations to one or more areas, corresponding to the ROI for constructing table, in the one or more feature maps and (ii-2) has generated the second pooled feature map for constructing table by applying one or more average pooling operations to one or more areas, corresponding to the ROI for constructing table, in the one or more feature maps; and (iii-1) has allowed the first FC layer to acquire information on pixel data of the first candidate bounding box for constructing table by applying regression operations to the first pooled feature map for constructing table, and (iii-2) has allowed the second FC layer to acquire information on pixel data of the second candidate bounding box for constructing table by applying regression operations to the second pooled feature map for constructing table; and (IV) the table-constructing device has compared (i) the first degree of similarity between the first candidate bounding box for constructing table and the GT bounding box for constructing table with (ii) the second degree of similarity between the second candidate bounding box for constructing table and the GT bounding box for constructing table to thereby construct the table so as to include the information on the respective optimal pooling types by respective ranges of the scale of the object in the GT image or in the image for constructing table; the communication part 610 of the testing device 600 may acquire or support another device to acquire the test image.

Then, the testing device 600 may allow the plurality of convolutional layers to apply the convolution operations to the test image to thereby acquire one or more feature maps for testing, and allow the RPN to perform certain operations on the at least one of feature maps for testing to thereby acquire an ROI for testing.

Thereafter, the testing device 600 may generate a pooled feature map for testing by using a specific optimal pooling type selected among the max pooling type and the average pooling type, wherein the specific optimal pooling type is determined by referring to the table which includes the information corresponding to the range of the scale and/or the category of the object for testing.

Accordingly, the testing device 600 may acquire a bounding box for testing by applying regression operations to the pooled feature map for testing via the FC layer.

The present invention has an effect of applying a different pooling scheme according to the scales and/or the categories of the respective objects in the input image.

In addition, the present invention has another effect of combining the max pooling operations with the average pooling operations to acquire the best combination of the pooling operations in order to reduce feature losses.

Besides, the present invention has still another effect of improving accuracy of object detection and feature expressiveness by applying the different pooling scheme on a basis of the scale and/or the category of the object.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled artisan in a pertinent field. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language codes made by a complier but also a high level codes that can be used by an interpreter etc., which is executed by a computing device. The aforementioned hardware device can work as more than a software module to perform the technical features of the present invention and they can do the same in the opposite case.

As seen above, the present invention has been specifically described by such matters as detailed components, limited embodiments, and drawings. While the invention has been shown and described with respect to the preferred embodiments, it, however, may be appreciated by those skilled in the art that various changes and modifications may be made without departing from the spirit and the scope of the present invention as defined in the following claims.

Accordingly, the thought of the present invention must not be confined to the explained preferred or example embodiments, and the following patent claims as well as everything including variations equal or equivalent to the patent claims pertain to the category of the thought of the present invention.

What is claimed is:

1. A method for constructing a table including information on a pooling type based on ranges of scale of at least one object in at least one image for constructing table, comprising steps of:

(a) a table-constructing device acquiring or supporting another device to acquire the image for constructing table including the object as an input for a CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process;

(b) the table-constructing device allowing the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table;

(c) the table-constructing device (c-1) generating a first pooled feature map for constructing table by applying one or more max pooling operations to one or more areas, corresponding to the ROI for constructing table, in the one or more feature maps and (c-2) generating a second pooled feature map for constructing table by applying one or more avg pooling operations to one or more areas, corresponding to the ROI for constructing table, in the one or more feature maps; and (c-3) allowing the first FC layer to acquire information on pixel data of a first candidate bounding box for constructing table by applying regression operations to the first pooled feature map for constructing table, and (c-4) allowing the second FC layer to acquire information on pixel data of a second candidate bounding box for constructing table by applying regression operations to the second pooled feature map for constructing table; and (d) the table-constructing device comparing a first degree of similarity between the first candidate bounding box for constructing table and a bounding box in a second GT image with a second degree of similarity between the second candidate bounding box for constructing table and the bounding box in the second GT image to thereby construct the table so as to include information on respective optimal pooling types by respective ranges of the scale of the object in the second GT image or the object in the image for constructing table.

2. The method of claim 1, wherein, at the processes of (c-1) and (c-2) in the step of (c), the table-constructing device generates the first pooled feature map for constructing table by applying one of the max pooling operations to a specific area, corresponding to the ROI for constructing table, in a specific feature map among the one or more feature maps, and the second pooled feature map for constructing table by applying one of the avg pooling operations to the specific area, corresponding to the ROI for constructing table, in the specific feature map among the one or more feature maps.

3. The method of claim 1, wherein, at the processes of (c-1) and (c-2) in the step of (c), the table-constructing device generates the first pooled feature map for constructing table by applying the max pooling operations to a certain plural number of areas, corresponding to the ROI for constructing table, in the certain plural number of feature maps among the one or more feature maps, and the second pooled feature map for constructing table by applying the avg pooling operations to the certain plural number of areas, corresponding to the ROI for constructing table, in the certain plural number of feature maps among the one or more feature maps.

4. The method of claim 3, wherein, at the step of (d), each of the optimal pooling types includes either of (i) the certain plural number of sub-pooling types corresponding to the certain plural number of feature maps or (ii) an integrated pooling type determined by referring to the certain plural number of the sub-pooling types.

5. The method of claim 1, wherein, at the step of (d), the table-constructing device compares (i) the first degree of similarity between the first candidate bounding box for constructing table and the bounding box in the second GT image with (ii) the second degree of similarity between the second candidate bounding box for constructing table and the bounding box in the second GT image to thereby construct the table so as to include the information on the respective optimal pooling types by (i) respective ranges of the scale of the object in the second GT image or the object in the image for constructing table and (ii) respective categories of the object therein.

6. The method of claim 1, wherein, at the step of (d), the table-constructing device constructs the table so as to include the information on the respective optimal pooling types by the respective ranges of the scale of the object with a reference to a ratio determined as the number of the categories with a max pooling type to that of the categories with an avg pooling type for each of the ranges of the scale of the object.

7. The method of claim 1, wherein the table-constructing device designates and manages a critical range of the scale of the object per a category of the object, where the critical range is a specific range of the scale of the object upon which the first degree of similarity is greater than or equal to the second degree of similarity.

8. The method of claim 1, wherein a degree of similarity is determined as a ratio of an area corresponding to an intersection of an area of a candidate bounding box for constructing table and that of the bounding box in the second GT image to an area corresponding to a union of the area of the candidate bounding box for constructing table and that of the bounding box in the second GT image, where the degree of similarity includes the first and the second degrees of similarity, and the candidate bounding box for constructing table includes the first candidate bounding box for constructing table and the second candidate bounding box for constructing table.

9. The method of claim 1, wherein the scale of the object is determined by referring to at least one of the number of pixel data included in the first and the second candidate bounding boxes corresponding to the object in the image for constructing table and the number of pixel data included in the bounding box of the second GT image.

10. A method for using a table including information on a pooling type for at least one object for testing in at least one test image by using a testing device including a CNN, comprising steps of:
(a) the testing device acquiring or supporting another device to acquire the test image, on the condition that (I) a table-constructing device has acquired at least one image for constructing table including at least one object for constructing table as an input for the CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process; (II) the table-constructing device has allowed the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (III) the table-constructing device (ii-1) has generated a first pooled feature map for constructing table by applying one or more max pooling operations to one or more areas, corresponding to the ROI for constructing table, in the one or more feature maps and (ii-2) has generated a second pooled feature map for constructing table by applying one or more avg pooling operations to one or more areas, corresponding to the ROI for constructing table, in the one or more feature maps; and (iii-1) has allowed the first FC layer to acquire information on pixel data of a first candidate bounding box for constructing table by applying regression operations to the first pooled feature map for constructing table, and (iii-2) has allowed the second FC layer to acquire information on pixel data of a second candidate bounding box for constructing table by applying regression operations to the second pooled feature map for constructing table; and (IV) the table-constructing device has compared (i) a first degree of similarity between the first candidate bounding box for constructing table and a bounding box in a second GT image with (ii) a second degree of similarity between the second candidate bounding box for constructing table and the bounding box in the second GT image to thereby construct the table so as to include information on respective optimal pooling types by respective ranges of the scale of the object in the second GT image or the object in the image for constructing table;
(b) the testing device allowing the plurality of convolutional layers to apply the convolution operations to the test image to thereby acquire one or more feature maps for testing, and allowing the RPN to perform certain operations on the at least one of feature maps for testing to thereby acquire an ROI for testing;
(c) the testing device generating a pooled feature map for testing by using a specific optimal pooling type selected among the max pooling type and the avg pooling type, wherein the specific optimal pooling type is determined by referring to the table which includes information corresponding to the scale of the ROI for testing;
(d) the testing device acquiring a bounding box for testing by applying regression operations to the pooled feature map for testing via the FC layer.

11. The method of claim 10, wherein the testing device, on condition that the feature maps for testing with different sizes are acquired as a result of applying convolution operations to the test image, generates the pooled feature map for testing by using sub-pooling types corresponding to the feature maps for testing, wherein the sub-pooling types are determined by referring to the table which includes information corresponding to the scale of the object for testing.

12. The method of claim 10, wherein the testing device, at the step of (b), generates the pooled feature map for testing by using the specific optimal pooling type selected among the max pooling type and the avg pooling type, wherein the specific optimal pooling type is determined by referring to the table which includes information corresponding to the scale of the ROI for testing and a category of the object for testing.

13. The method of claim 10, wherein, at the step of (b), the scale of the ROI for testing are determined by referring to the number of pixel data included therein.

14. A table-constructing device for constructing a table including information on a pooling type based on ranges of scale of at least one object in at least one image for constructing table, comprising:
a communication part for acquiring or supporting another device to acquire the image for constructing table including the object as an input for a CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process;

a processor for (I) allowing the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (II) (II-1) generating a first pooled feature map for constructing table by applying one or more max pooling operations to one or more areas, corresponding to the ROI for constructing table, in the one or more feature maps and (II-2) generating a second pooled feature map for constructing table by applying one or more avg pooling operations to one or more areas, corresponding to the ROI for constructing table, in the one or more feature maps; and (II-3) allowing the first FC layer to acquire information on pixel data of a first candidate bounding box for constructing table by applying regression operations to the first pooled feature map for constructing table, and (II-4) allowing the second FC layer to acquire information on pixel data of a second candidate bounding box for constructing table by applying regression operations to the second pooled feature map for constructing table; and (III) comparing a first degree of similarity between the first candidate bounding box for constructing table and a bounding box in a second GT image with a second degree of similarity between the second candidate bounding box for constructing table and the bounding box in the second GT image to thereby construct the table so as to include information on respective optimal pooling types by respective ranges of the scale of the object in the second GT image or the object in the image for constructing table.

15. The table-constructing device of claim 14, wherein, at the processes of (II-1) and (II-2), the processor generates the first pooled feature map for constructing table by applying one of the max pooling operations to a specific area, corresponding to the ROI for constructing table, in a specific feature map among the one or more feature maps, and the second pooled feature map for constructing table by applying one of the avg pooling operations to the specific area, corresponding to the ROI for constructing table, in the specific feature map among the one or more feature maps.

16. The table-constructing device of claim 14, wherein, at the processes of (II-1) and (II-2), the processor generates the first pooled feature map for constructing table by applying the max pooling operations to a certain plural number of areas, corresponding to the ROI for constructing table, in the certain plural number of feature maps among the one or more feature maps, and the second pooled feature map for constructing table by applying the avg pooling operations to the certain plural number of areas, corresponding to the ROI for constructing table, in the certain plural number of feature maps among the one or more feature maps.

17. The table-constructing device of claim 16, wherein, at the process of (III), each of the optimal pooling types includes either of (i) the certain plural number of sub-pooling types corresponding to the certain plural number of feature maps or (ii) an integrated pooling type determined by referring to the certain plural number of the sub-pooling types.

18. The table-constructing device of claim 14, wherein, at the process of (III), the processor compares (i) the first degree of similarity between the first candidate bounding box for constructing table and the bounding box in the second GT image with (ii) the second degree of similarity between the second candidate bounding box for constructing table and the bounding box in the second GT image to thereby construct the table so as to include the information on the respective optimal pooling types by (i) respective ranges of the scale of the object in the second GT image or the object in the image for constructing table and (ii) respective categories of the object therein.

19. The table-constructing device of claim 14, wherein, at the process of (III), the processor constructs the table so as to include the information on the respective optimal pooling types by the respective ranges of the scale of the object with a reference to a ratio determined as the number of the categories with a max pooling type to that of the categories with an avg pooling type for each of the ranges of the scale of the object.

20. The table-constructing device of claim 14, wherein the processor designates and manages a critical range of the scale of the object per a category of the object, where the critical range is a specific range of the scale of the object upon which the first degree of similarity is greater than or equal to the second degree of similarity.

21. The table-constructing device of claim 14, wherein a degree of similarity is determined as a ratio of an area corresponding to an intersection of an area of a candidate bounding box for constructing table and that of the bounding box in the second GT image to an area corresponding to a union of the area of the candidate bounding box for constructing table and that of the bounding box in the second GT image, where the degree of similarity includes the first and the second degrees of similarity, and the candidate bounding box for constructing table includes the first candidate bounding box for constructing table and the second candidate bounding box for constructing table.

22. The table-constructing device of claim 14, wherein the scale of the object is determined by referring to at least one of the number of pixel data included in the first and the second candidate bounding boxes corresponding to the object in the image for constructing table and the number of pixel data included in the bounding box of the second GT image.

23. A testing device for using a table including information on a pooling type for at least one object for testing in at least one test image, comprising:

a communication part for acquiring or supporting another device to acquire the test image, on the condition that (I) a table-constructing device has acquired at least one image for constructing table including at least one object for constructing table as an input for a CNN with adjusted parameters, wherein the adjusted parameters have been acquired by a learning device performing processes of (i) dividing an area in one or more feature maps for training corresponding to a region of interest (ROI) for training into multiple sub-regions if the one or more feature maps for training are generated as a result of applying convolution operations to the training image, and if the region of interest (ROI) for training is acquired from a Region Proposal Network (RPN); (ii)(ii-1) generating a first pooled feature map for training by applying one or more max pooling operations to one or more areas, corresponding to the ROI for training, in the one or more feature maps, wherein each of the max pooling operations selects a pixel with the maximum pixel value among all pixels in each of the multiple sub-regions and (ii-2) generating a second pooled feature map for training by applying one or more avg pooling operations to one or more areas, corresponding to the ROI for training, in the one or more feature maps, wherein each of the avg pooling operations averages all the pixel values included in each of the multiple sub-regions; and (iii)(iii-1) allowing a first FC layer to acquire information on pixel data of a first candidate bounding box for training by applying regression operations to the first pooled feature map for training, and allowing a first loss layer to acquire first comparative data by comparing between information on the pixel data of the first candidate bounding box for training and that of a bounding box of a first GT image, thereby using the first comparative data to adjust at least one of parameters of the CNN during a backpropagation process, and (iii-2) allowing a second FC layer to acquire information on pixel data of a second candidate bounding box for training by applying regression operations to the second pooled feature map for training, and allowing a second loss layer to acquire second comparative data by comparing between information on the pixel data of the second candidate bounding box for training and that of the bounding box of the first GT image, thereby using the second comparative data to adjust at least one of parameters of the CNN during a backpropagation process; (II) the table-constructing device has allowed the plurality of convolutional layers to apply the convolution operations to the image for constructing table to thereby acquire one or more feature maps for constructing table, and allowing the RPN to perform certain operations on the at least one of feature maps for constructing table to thereby acquire an ROI for constructing table; (III) the table-constructing device (ii-1) has generated a first pooled feature map for constructing table by applying one or more max pooling operations to one or more areas, corresponding to the ROI for constructing table, in the one or more feature maps and (ii-2) has generated a second pooled feature map for constructing table by applying one or more avg pooling operations to one or more areas, corresponding to the ROI for constructing table, in the one or more feature maps; and (iii-1) has allowed the first FC layer to acquire information on pixel data of a first candidate bounding box for constructing table by applying regression operations to the first pooled feature map for constructing table, and (iii-2) has allowed the second FC layer to acquire information on pixel data of a second candidate bounding box for constructing table by applying regression operations to the second pooled feature map for constructing table; and (IV) the table-constructing device has compared (i) a first degree of similarity between the first candidate bounding box for constructing table and a bounding box in a second GT image with (ii) a second degree of similarity between the second candidate bounding box for constructing table and the bounding box in the second GT image to thereby construct the table so as to include information on respective optimal pooling types by respective ranges of the scale of the object in the second GT image or the object in the image for constructing table;

a processor for (AA) allowing the plurality of convolutional layers to apply the convolution operations to the test image to thereby acquire one or more feature maps for testing, and allowing the RPN to perform certain operations on the at least one of feature maps for testing to thereby acquire an ROI for testing; (BB) generating a pooled feature map for testing by using a specific optimal pooling type selected among the max pooling type and the avg pooling type, wherein the specific optimal pooling type is determined by referring to the table which includes information corresponding to the scale of the ROI for testing; (CC) acquiring a bounding box for testing by applying regression operations to the pooled feature map for testing via the FC layer.

24. The testing device of claim 23, wherein the processor, on condition that the feature maps for testing with different sizes are acquired as a result of applying convolution operations to the test image, generates the pooled feature map for testing by using sub-pooling types corresponding to the feature maps for testing, wherein the sub-pooling types are determined by referring to the table which includes information corresponding to the scale of the object for testing.

25. The testing device of claim 23, wherein the processor, at the process of (AA), generates the pooled feature map for testing by using the specific optimal pooling type selected among the max pooling type and the avg pooling type, wherein the specific optimal pooling type is determined by referring to the table which includes information corresponding to the scale of the ROI for testing and a category of the object for testing.

26. The testing device of claim 23, wherein, at the process of (AA), the scale of the ROI for testing are determined by referring to the number of pixel data included therein.

* * * * *